(12) United States Patent
Schanin et al.

(10) Patent No.: US 7,286,907 B2
(45) Date of Patent: Oct. 23, 2007

(54) METHOD AND APPARATUS FOR CONSERVING POWER CONSUMED BY A REFRIGERATED APPLIANCE UTILIZING AUDIO SIGNAL DETECTION

(75) Inventors: David Schanin, Denver, CO (US); Dan van der Hoop, Boulder, CO (US); Gary Strong, Arvada, CO (US)

(73) Assignee: USA Technologies, Inc., Malvern, PA (US)

( * ) Notice: Subject to any disclaimer, the term of this patent is extended or adjusted under 35 U.S.C. 154(b) by 618 days.

(21) Appl. No.: 10/901,615

(22) Filed: Jul. 28, 2004

(65) Prior Publication Data

US 2005/0178135 A1 Aug. 18, 2005

Related U.S. Application Data

(60) Provisional application No. 60/544,280, filed on Feb. 12, 2004.

(51) Int. Cl.
*F25B 1/00* (2006.01)
*G06F 19/00* (2006.01)
*G05D 3/12* (2006.01)
*F25B 49/00* (2006.01)

(52) U.S. Cl. ............... 700/300; 700/295; 700/231; 700/232; 700/240; 62/228.1; 62/230; 381/71.2

(58) Field of Classification Search ........... 700/231, 700/232, 240, 295, 300; 62/228.1, 230; 381/71.2
See application file for complete search history.

(56) References Cited

U.S. PATENT DOCUMENTS 4,485,633 A 12/1984 King et al.

4,612,535 A * 9/1986 Sequin et al. .......... 340/539.26

(Continued)

FOREIGN PATENT DOCUMENTS

EP 0 707 183 A 4/1996

(Continued)

OTHER PUBLICATIONS

"WurliTzer Universal Vending Machines" Data sheets. Wurlitzer 1000 and 850 models.*

(Continued)

*Primary Examiner*—Michael D. Masinick
(74) *Attorney, Agent, or Firm*—RatnerPrestia

(57) ABSTRACT

A refrigerated appliance that dispenses items for use with a power source and includes a cooling system. Power control circuitry is electrically coupled between the power source and components (for example, a compressor and one or more circulating fans of the cooling system) of the appliance. A controller, which is operably coupled to the power control circuitry, is adapted to manage the supply of electrical power to such components by intelligently transitioning between a normal-operation mode and at least one power-conserving mode. To achieve efficient power conservation, an audio signal detector is provided that generates at least one dispensing event signal that represents the occurrence of one or more sound-based dispensing events. The controller automatically transitions between the power-conserving mode(s) and the normal-operation mode based upon at least one dispensing event data signal supplied to the controller by the audio signal detector, and possibly other data signals supplied to the controller.

43 Claims, 6 Drawing Sheets

U.S. PATENT DOCUMENTS

| | | | |
|---|---|---|---|
| 5,010,739 A | | 4/1991 | Isshiki et al. |
| 5,050,769 A | * | 9/1991 | Levasseur ..................... 221/1 |
| 5,209,373 A | * | 5/1993 | Gondek et al. ....... 221/150 HC |
| 5,647,220 A | | 7/1997 | Kawaguchi et al. |
| 5,982,860 A | * | 11/1999 | Kim ..................... 379/100.15 |
| 6,085,534 A | * | 7/2000 | Anthony ..................... 62/231 |
| 6,131,399 A | | 10/2000 | Hall et al. |
| 6,243,626 B1 | | 6/2001 | Schanin |
| 6,389,822 B1 | * | 5/2002 | Schanin ......................... 62/89 |
| 6,745,581 B2 | | 6/2004 | King et al. |
| 7,040,535 B2 | * | 5/2006 | Sato et al. .................. 235/381 |
| 2003/0182958 A1 | | 10/2003 | Gray et al. |
| 2004/0000154 A1 | | 1/2004 | Schanin |
| 2005/0077998 A2 | * | 4/2005 | Denison et al. ............ 340/5.64 |
| 2005/0149773 A1 | * | 7/2005 | Kevan ........................ 713/320 |

FOREIGN PATENT DOCUMENTS

| | | |
|---|---|---|
| WO | WO 01/90668 A | 11/2001 |
| WO | WO 02/51228 A | 6/2002 |

OTHER PUBLICATIONS

International Search Report for PCT International Application No. PCT/US2005/004686 mailed Apr. 22, 2005.

* cited by examiner

METHOD AND APPARATUS FOR CONSERVING POWER CONSUMED BY A REFRIGERATED APPLIANCE UTILIZING AUDIO SIGNAL DETECTION

CROSS REFERENCE TO RELATED APPLICATIONS

This application claims the benefit of the filing date of U.S. Provisional Application No. 60/544,280 entitled "METHOD AND APPARATUS FOR CONSERVING POWER CONSUMED BY A REFRIGERATED APPLIANCE UTILIZING AUDIO SIGNAL DETECTION" filed Feb. 12, 2004, the contents of which are incorporated herein by reference.

FIELD OF THE INVENTION

The present invention relates to refrigerated dispensing appliances and, more particularly, to mechanisms for automatic control of electrical power supplied to the components of a refrigerated dispensing appliance in a manner that conserves electrical power consumption.

BACKGROUND OF THE INVENTION

Refrigerated dispensing appliances (including vending machines and reach-in type beverage coolers) provide for cost-effective delivery of consumer items. In principle, they provide full-time product availability with minimal intervention by a human operator. However, full-time operation can result in wasted energy consumption as the machine may be on for long intervals of inactivity. The concern for energy consumption is especially acute in the case of refrigerated dispensing appliances.

Refrigerated dispensing appliances generally maintain their contents at a standard temperature on the order of 36° F. There can be various reasons for keeping the dispensable items cold. Cold generally helps preserve perishable food items. In some cases, for example, with soda and other beverages, the items may taste better chilled.

Typically, the dispensable items are maintained within a chamber that is thermally insulated from the exterior of the machine. A cooling system withdraws heat from the chamber. The cooling system can include an evaporator, a compressor, a condenser, and a metering (flow constricting) device.

When the cooling system is on, coolant liquid, e.g., Freon, enters the evaporator. The evaporator is thermally coupled to the refrigerated chamber. The coolant liquid is generally colder than the chamber so that the coolant removes heat from the chamber. The liquid evaporates as it absorbs the heat. The evaporated coolant is pumped out of the evaporator through a suction line by a compressor. The compressor increases the pressure of the coolant, raising its temperature in the process. The pressurized coolant is then directed to a condenser via a discharge line. The condenser couples the coolant to a chilled environment. This causes the coolant to give up heat and condense into a liquid. The liquid flows through a liquid line, including the flow meter (which is basically a flow restriction) back to the evaporator to begin another cooling cycle. The evaporator removes heat from the nearby chamber air. To ensure that the cool air reaches the dispensable items and to ensure a uniform temperature within the chamber, the chamber air is circulated. Generally, one or more fans are operated within the chamber interior to effect this circulation.

One or more temperature sensors monitor the temperature inside the chamber. Typically, there is a desired temperature range for the vended items, for example, 0° to 2° C. (~32° F. to 36° F.) for cold drinks. When the chamber temperature reaches the higher threshold, the compressor is activated and the cooling process begins. When the chamber temperature falls to the lower threshold, the compressor is turned off, and cooling effectively halts. Another cooling cycle can begin when the temperature reaches the upper threshold due to inevitable heat transfer through the chamber wall.

Refrigerated dispensing appliances consume considerable electric power. Typically, most of the power consumed by a refrigerated dispensing appliance is consumed by the cooling system, and especially by the compressor, even though it is not operated continuously. However, the fans, the dispensing mechanism, the money handling mechanisms, panel lights, sensors, and control electronics all consume power. For reasons of energy conservation and cost, it is desirable to be able to reduce the energy consumed by a refrigerated dispensing appliance without adversely affecting its service (to patrons) and its economic viability (to the appliance owner).

The most straightforward approach to saving energy is to disconnect AC power. For example, a refrigerated vending appliance could be turned off during non-business hours, e.g., from 10 pm to 6 am. To avoid the inconvenience of manual activation and inactivation, an external timer can be used to control AC power to the vending machine. However, whether power to the vending machine is switched by a human operator or a timer, potential patrons are denied dispensable items during off hours. Additionally, most artificially-sweetened products deteriorate under such temperature cycling. Such temperature cycling also causes cold cans and bottles to "sweat" or develop a water film due to condensation.

Additionally, present cold drink dispensing machines are nearly all electronically controlled, having internal electronics to control operation of the cooling and possibly lighting systems, as well as cash collection and disbursement and possibly non-cash transactions (e.g. credit cards). However, reach-in type beverage coolers, lacking the requirements for cash management, are typically mechanically based, using a simple mechanical thermostat to regulate the operation of its cooling system.

U.S. Pat. No. 6,243,626, to Schanin, commonly assigned to the assignee of the present invention, discloses an external power control system for a vending machine that includes an occupancy sensor. This can be used to ensure a vending machine is on whenever people are in its vicinity. An ambient thermo-sensor can also be included to determine a reactivation time to prevent the dispensable items from become unacceptably warm.

U.S. Pat. No. 6,389,822 to Schanin, commonly assigned to the assignee of the present invention, discloses a refrigerated soda vending machine that includes temperature sensors for monitoring temperature within its refrigerated chamber and temperature of the ambient air external to the chamber, and an occupancy sensor for monitoring occupancy in the vicinity of the chamber. The sensor data is used to determine when to switch between a normal-operation mode and a power-conservation mode of operation. In the normal mode of operation, fans circulate air within the chamber to maintain a relatively uniform temperature throughout the chamber. During power-conservation mode, the fans are off most of the time the compressor is off. In the absence of circulation, the temperature within the refrigerated chamber stratifies so that a lower cool zone and an upper warm zone can be differentiated. Cold drink cans or bottles are held in vertical stacks so that the lowest product is located in the cool zone. Product is dispensed from the bottom of the stacks and thus only from the cool zone. The machine automatically switches from the power-conserving mode to the normal mode in the event that the occupancy sensor senses occupancy in the vicinity of the machine. With this arrangement, a patron can obtain an optimally chilled product even though the average temperature in the chamber is above the optimal temperature range. Thus, energy can be conserved and operating costs reduced while meeting patron's expectations for cold beverages at all times.

While these power-saving control mechanisms are effective in that there is no risk of lost sale due to a customer believing the machine is non-operational, such mechanisms may be inefficient in circumstances where people walking in the vicinity of the machine are not interested in buying products. In such circumstances, exiting the power-conserving mode based on occupancy is not efficient.

SUMMARY OF THE INVENTION

The present invention includes a refrigerated dispensing appliance for use with a power source and comprising a cooling system. Power control circuitry is electrically coupled between the power source (e.g., power cord coupled to a wall outlet) and components (for example, a compressor and one or more circulating fans of the cooling system) of the appliance. A controller is adapted to control the power control circuitry to manage the supply of electrical power to such components by intelligently transitioning between a normal-operation mode and at least one power-conserving mode. To achieve efficient power conservation, an audio signal detector is provided that generates at least one dispensing event signal that represents the occurrence of one or more sound-based dispensing events. The controller automatically transitions between the power-conserving mode(s) and the normal-operation mode based upon at least one dispensing event data signal supplied to the controller by the audio signal detector.

The dispensing event data signals are indicative of one or more predetermined dispensing events that occur during dispensing operations. Such dispensing events depend upon the location of the pickup device of the audio signal generator. For example, the pickup device may be disposed in the vicinity of a dispensing port to sense items passing therethrough. In another example, the pickup device may be disposed in the vicinity of a customer-access delivery mechanism to sense manipulation of the customer-access delivery mechanism by a patron. In yet another example, the pickup device may be disposed in the vicinity of mechanized devices (e.g., motorized actuators) that select product during dispensing operations to sense operation of the mechanized devices.

According to one embodiment of the present invention, the refrigerated dispensing appliance is a refrigerated beverage vending machine having the intelligent power-management controller that performs normal-operating mode cooling control operations in addition to power-conserving mode cooling operations.

In another embodiment of the present invention, the intelligent power-management controller is part of a module that interrupts normal-operating mode cooling operations performed by a machine controller to provide power-conserving mode cooling control of the refrigerated beverage vending machine.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
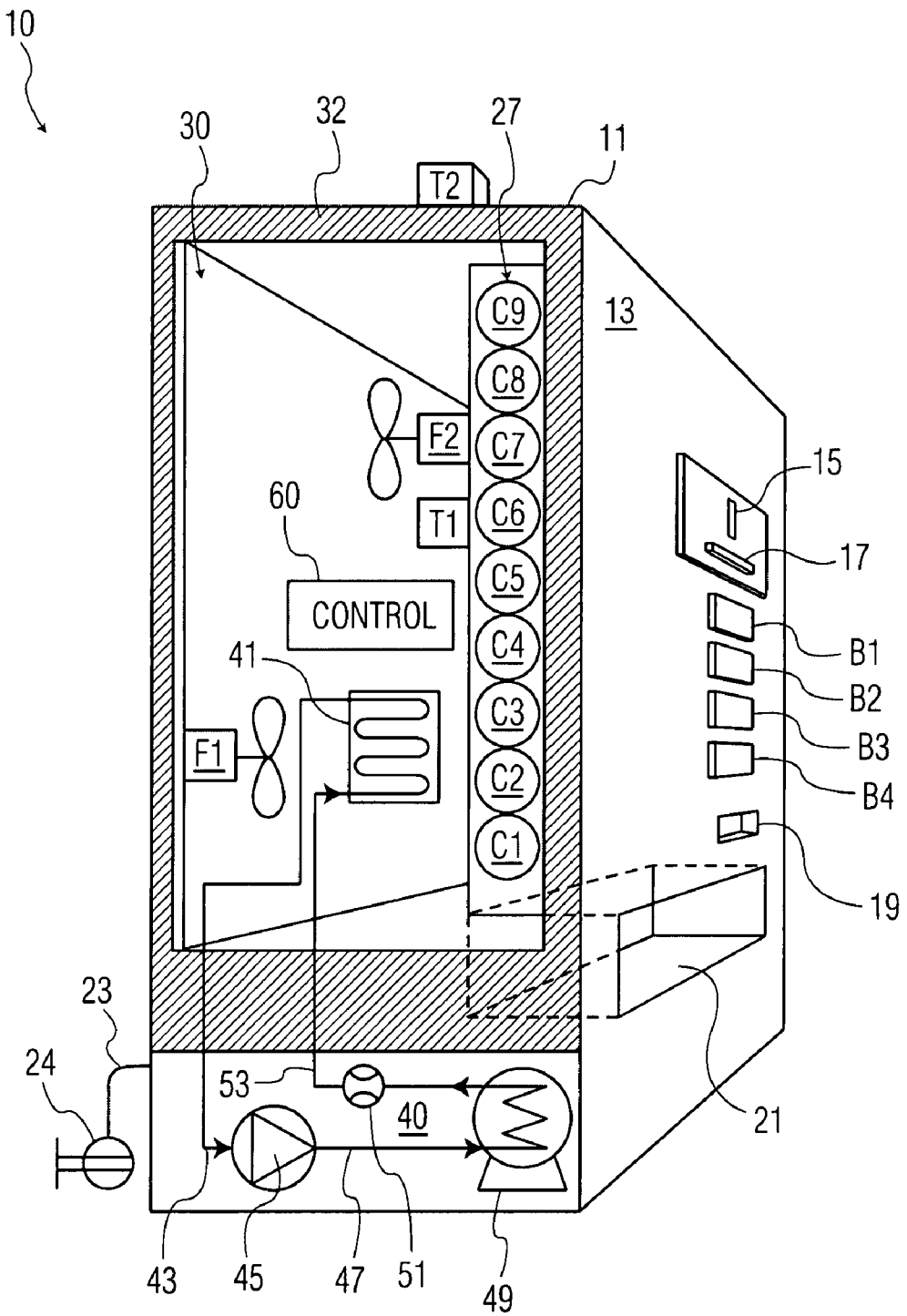
FIG. 1 is a schematic view of a refrigerated beverage vending machine in accordance with an exemplary embodiment of the present invention.

Turning now to FIG. 1, a refrigerated beverage vending machine 10 in accordance with the present invention includes a housing 11 with a front panel 13. Front panel 13 comprises coin slot 15 and bill slot 17, selection buttons B1, B2, B3, and B4, coin return slot 19, and dispensed beverage slot 21. Typically, a patron inserts a suitable amount of money in coin slot 15 and/or bill slot 17, depresses a selection button B1-B4, and receives a container of the selected beverage from slot 21. If the patron inserts more than the required amount for purchase, vending machine 10 provides change at coin return slot 19. Power for vending machine 10 is provided through power cord 23 plugged into an electric outlet 24 that supplies an AC power signal (e.g., 120 volt AC signal).

Beverage dispensing mechanism 25 holds beverage containers (e.g., cans) in four vertical stacks (one stack 27 shown). Each stack is intended to hold the type of beverages indicated by a respective one of the selection buttons B1-B4; for example, depressing button B1 serves as a request for an item from stack 27. In stack 27, nine exemplary containers C1-C9 are stacked. When a patron depresses button B1, dispensing mechanism 25 dispenses beverage container C1. The remaining containers C2-C8 then move down, assisted by gravity, one container position each. Dispensing mechanism 25 and the containers it holds are located within a chamber 30 that is desirably thermally insulated from its exterior by insulation 32.

A cooling system 40 is used to keep chamber 30 and its contents near freezing so that the beverage containers disposed therein are optimally chilled. Cooling system 40 comprises evaporator 41, suction line 43, compressor 45, discharge line 47, condenser 49, and flow meter 51 located along liquid line 53. Evaporator 41 is located within chamber 30 and withdraws heat therefrom. The remaining components of cooling system 40 serve to recycle the coolant so that it can remove heat continuously from chamber 30.

Figure 2:
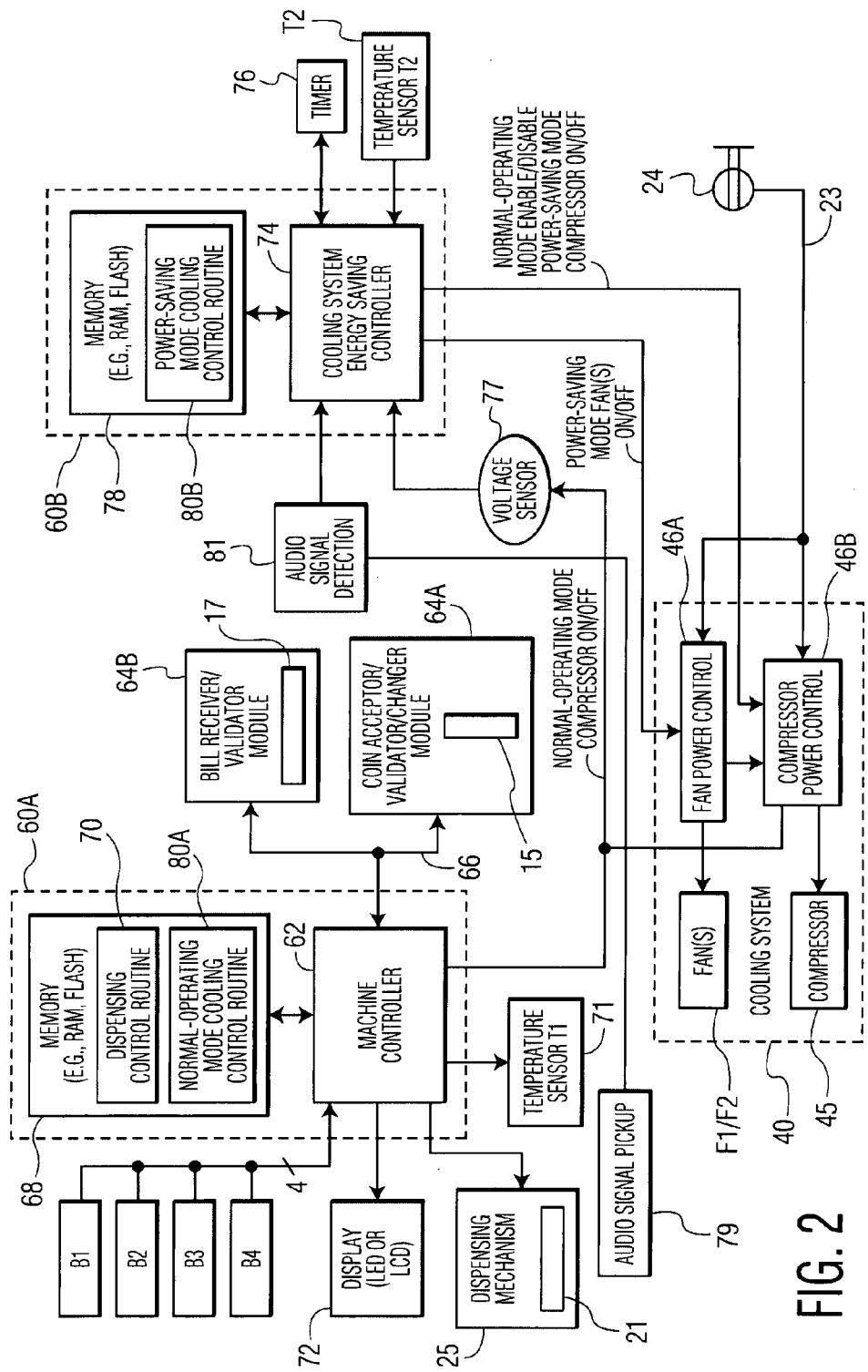
FIG. 2 is a block diagram of an exemplary control system of the refrigerated beverage vending machine of FIG. 1 in accordance with an exemplary embodiment of the present invention.

Cooling system 40 primarily cools the air near evaporator 41. Fans F1 and F2 circulate air within chamber 30 so that the cool air chills the containers and their contents. In addition, this circulation ensures a relatively uniform temperature distribution, i.e., a relatively low temperature variance, within chamber 30. As shown in FIG. 2, the cooling system 40 also includes power control circuitry 46A and 46B, that are operably disposed between the power source (e.g., power cord 23 that is plugged into outlet 24) and the compressor 45 and the circulating fans F1 and F2, respectively. The power control circuitry 46A, 46B (which may be realized by relays or other power switching devices) switch on and off the supply of power to the compressor 45 and the circulating fans F1 and F2, respectively, in response to control signals supplied by the cooling system controller 74 as described below in more detail.

Referring again to FIG. 1, vending machine 10 includes control subsystem 60 that controls dispensing of beverage containers by the dispensing mechanism 25 and controls the supply of power to the cooling system 40 to provide for automatic power conservation. FIG. 2 illustrates a functional block diagram of the control subsystem 60 of the exemplary refrigerated vending machine of FIG. 1. As shown in FIG. 2, control subsystem 60 includes two control modules 60$a$ and 60$b$. First control module 60$a$ includes machine controller 62 that is responsible for controlling dispensing operations and for normal-operation mode cooling operations. Second control module 60$b$ includes an energy saving cooling system controller 74 that is responsible for managing supply of power to electrical components (including the fans F1 and F2 and the compressor 45 of the cooling system 40) of vending machine 10 in the power-saving mode of operation in accordance with the power control operations of the present invention.

Machine controller 62 is operably coupled to at least one money handling module 64. Each money handling module 64 recognizes and validates currency supplied thereto (e.g., coins or bills inserted through slots 15, 17), generates data that provides an indication of the validated currency supplied thereto, and communicates such data to dispensing controller 62 over communication bus 66 therebetween. For example, the refrigerated vending machine 10 of FIG. 2 includes two money handling modules: a coin acceptor/validator/changer module 64A coupled to the machine controller 62 over communication bus 66; and a bill acceptor/validator module 64B coupled to the machine controller 62 over communication bus 66. The vending machine 10 may include additional money handling modules (not shown), such as a smart card reader that reads currency data stored in a smart card and/or a prepaid cash card. As shown in FIG. 2, communication bus 66 is a common bus operably coupled to multiple money handling modules. The common bus desirably comprises a serial multi-drop bus (MDB) commonly used in the vending arts. Alternatively, separate buses (or other data communication mechanisms) may be operably coupled to the money handling modules.

Machine controller 62 is operably coupled to system memory 68, which is typically realized with both at least one persistent memory module, such as a Flash memory module or EEPROM memory module, and at least one non-persistent memory module, such as a DRAM memory module or an SRAM module. The system memory 68 persistently stores a dispensing control routine 70 that is loaded by the machine controller 62 for execution therein. Dispensing control routine 70 includes a sequence of instructions that, when executed by the machine controller 62, monitor the data signals supplied by each money handling module 64 over communication bus 66 therebetween to count the amount of currency supplied by the patron and provide any change, if necessary. When the correct amount of currency has been supplied, dispensing controller 62 monitors the status of the selection buttons B1-B4. When the user selects one of buttons B1-B4, machine controller 62 controls dispensing mechanism 25 to dispense a beverage container corresponding to the selected button to dispensing slot 21. Machine controller 62 may also interface to display 72 (such as an LED or LCD display for example) in order to provide status information during the dispensing operations or to provide other information to the patron (or potential patron).

Machine controller 62 is operably coupled to temperature sensor T1 and operably coupled to compressor power control circuitry 46B as shown. Temperature sensor T1 provides an indication of the internal temperature of cavity 30 (see FIG. 1) of vending machine 10. Compressor power control circuitry 46B, which may be realized by a relay or other power switching device, is operably coupled between the power source (e.g., outlet 24 and cord 23) and compressor 45 of the machine's cooling system 40. Compressor power control circuitry 46B operates in either an on or off condition. In its on condition, compressor power control circuitry 46B electrically couples the power source to compressor 45. In its off condition, compressor power control circuit 46B electrically decouples compressor 45 from the power source. Compressor power control circuitry 46B has a control input that is coupled to machine controller 62. Through its connection to the control input, machine controller 62 is able to control when the compressor power control circuit 46B is in its on condition and when it is in its off condition.

In addition, system memory 68 persistently stores a normal-operation mode cooling routine 80$a$. The normal-operation mode cooling routine 80$a$ includes a sequence of instructions that, when executed by the machine controller 62, monitors the data signals provided by temperature sensor T1 (and possibly other data signals) and switches the compressor power control circuitry 46B on and off in order to maintain the desired internal temperature of chamber 30.

As described above, second control module 60B is responsible for realizing power-conserving mode cooling control of the vending machine 10. It includes cooling system controller 74 that is operably coupled to system memory 78, ambient temperature sensor T2, timer circuitry 76, voltage sensor 77, fan power control circuitry 46A and compressor power control circuitry 46B as shown. In addition, the controller 74 is operably coupled to audio signal pickup device 79 (such as a microphone or other transducer device) via audio signal detection circuitry 81 as shown. Audio signal pickup device 79 is located with the machine 10 such that it "hears" sounds related to dispensing events that occur during the dispensing operations of machine 10. For, example, the audio signal pickup device 70 may be located:

i) near a discharge chute through which the product passes during a sale;

ii) near mechanized devices (such as motors or other actuators) that select and/or delivers a desired product from an offering of products; and/or iii) near a customer-access delivery mechanism for the machine, which is typically realized by a small door that prohibits theft and the entry of elements and small animals.

Audio signal detection circuitry 81 processes the signal provided by pickup device 79 (which is typically a low level signal) to amplify (and possibly filter) the signal to a level that is suitable for use by the controller 74. Details of exemplary embodiments of the audio signal detection circuitry 81 are set forth below in FIGS. 3-5.

Fan power control circuitry 46A, which may be realized by a relay or other power switching device, is operably coupled between the power source (e.g., outlet 24 and cord 23) and circulating fans F1 and F2 of the machine's cooling system 40. The fan power control circuitry 46A operates in either an on or off condition. In its on condition, fan power control circuitry 46A electrically couples the power source to the circulating fans. In its off condition, fan power control circuit 46A electrically decouples the fans from the power source. Fan power control circuitry 46A has a control input that is coupled to cooling system energy saving controller 74. Through its connection to the control input, controller 74 controls when the fan power control circuit 46A is in its on condition and when it is in its off condition.

As described above, compressor power control circuit 46B operates in either an on or off condition to selectively supply power to compressor 45. Through a connection to a control input of circuit 46B, cooling system energy savings controller 74 is able to control when compressor power control circuit 46B is in its on condition and when it is in its off condition.

System memory 78 persistently stores a power-savings mode cooling system control routine 80b. Power savings mode cooling system control routine 80b includes a sequence of instructions that, when executed by controller 74, monitors the data signals provided by ambient temperature sensor T2, timer circuitry 76, voltage sensor 77, and audio signal detection circuitry 81. In response to these signals, controller 74 controls power control circuit 46 to automatically switch on and off the supply of electrical power to components (e.g., cooling fans F1/F2 and the compressor 45 of cooling system 40 and possibly other electrical components) of machine 10 to keep the beverages in the chamber of the vending machine 10 cool while minimizing the energy consumed by the cooling system 40, and thus provide valuable energy savings.

As described above, cooling system controller 74 monitors the signals provided by audio signal detection circuitry 81, and switches the on/off operating modes of components of cooling system 40 based upon these signals. Such signals are indicative of sounds related to dispensing events that occur during the operation of machine 10. Such dispensing events may include, for example, the delivery of product to a delivery location, the selection of one desired product from an offering of many products, customer access of a delivery mechanism (e.g., access door). These events occur every time a product (e.g., can or bottle) is dispensed from machine 10.

In the control architecture of FIG. 2, two separate controllers (62 and 74) perform the normal-operation mode cooling control and the power-saving mode cooling control, respectively. In this configuration, both controllers 62 and 74 control the supply of power to compressor 45 via control signals output to compressor power control circuit 46B. To provide for maximal power savings, it is desirable that energy saving controller 74 have the ability to selectively disable the normal-operation mode cooling operations performed by machine controller 62. This may be accomplished, for example, by adapting power control circuitry 46B such that the energy-savings mode compressor ON/OFF control signals supplied thereto by the energy saving controller selectively override (e.g., selectively disable) the normal-operation mode compressor ON/OFF power supply control signals supplied thereto by machine controller 62. This control override feature occurs in response to a control signal (e.g., normal-operation mode enable/disable signal) supplied to the compressor power control circuit 46B by energy saving controller 74.

It is also desirable that the power-saving mode cooling operations begin upon completion of a compressor-on cooling cycle performed by machine controller 62. To automatically sense the completion of such compressor-on cooling cycles, voltage sensor 77 is provided. As shown in FIG. 2, voltage sensor 77 is operably coupled to the control line between machine controller 62 and the corresponding control input of compressor power control circuit 46B. The data signals generated by voltage sensor 77 are monitored by cooling system energy saving controller 74 in order to identify completion of the compressor-on cooling cycles performed by machine controller 62.

Figure 3:
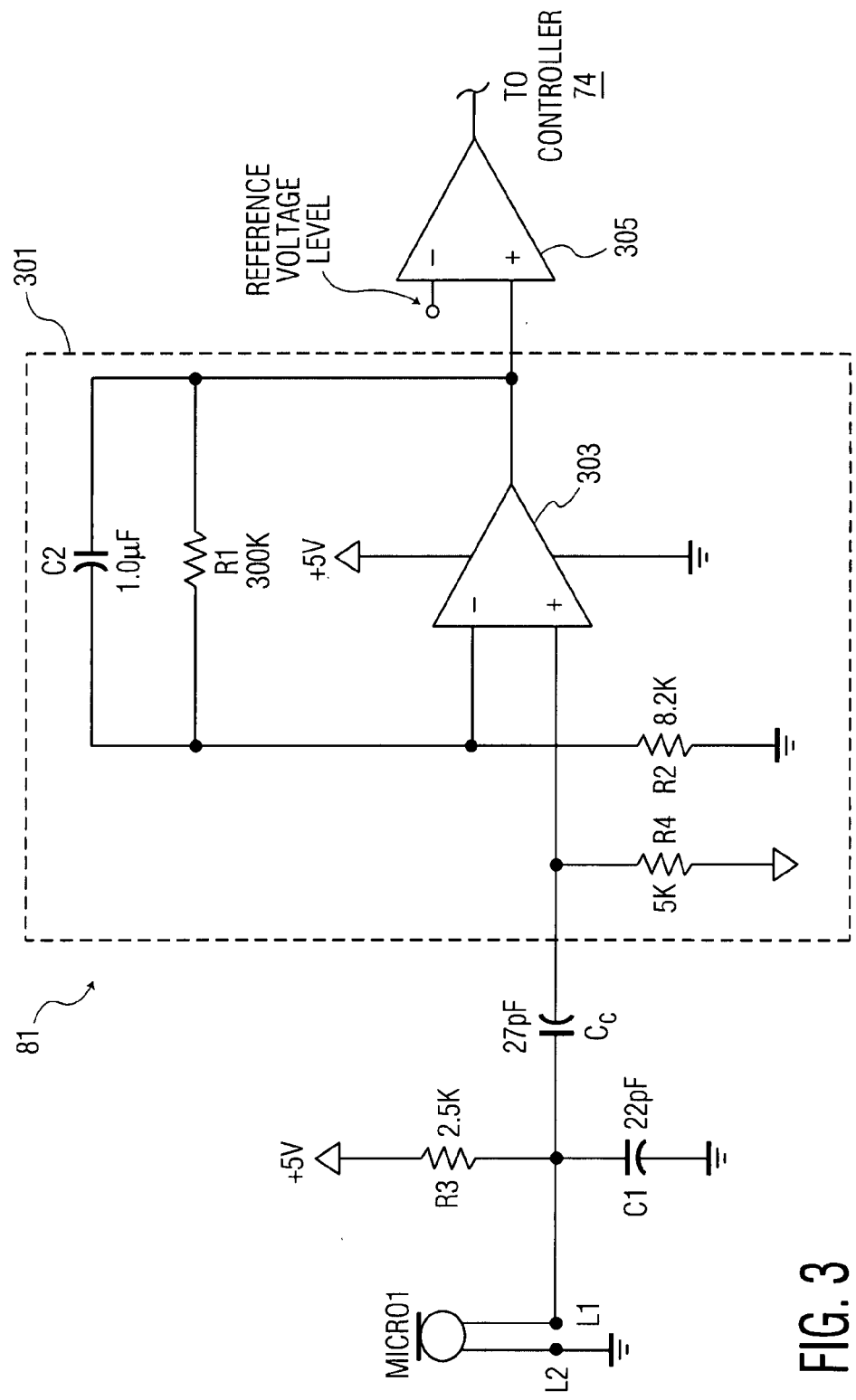
FIG. 3 is a schematic diagram of an exemplary embodiment of the audio signal detection circuitry of FIG. 2.

Turning now to FIG. 3, there is shown an exemplary realization of audio signal detection circuitry 81 of FIG. 2. The circuitry includes a bias resistor R3 (for example, on the order of 2.5 kOhms) coupled between a positive voltage supply (e.g., 5 Volts) and the positive lead L1 of the microphone pickup device (labeled "micro1"). The negative lead L2 of the microphone pickup device micro1 is coupled to ground. The microphone pickup device is preferably an electret condenser microphone cartridge, such as the Panasonic WM034DB model microphone cartridge. A capacitor C1 (for example, on the order of 22 pF) may be coupled between the positive lead L1 and ground for filtering out unwanted high frequency components generated at the positive lead L1 of the microphone pickup device. A coupling capacitor Cc (for example, on the order of 27 pF) is coupled between the positive lead L1 and an amplification stage 301 for DC isolation therebetween. The amplification stage 301 is realized by an operation amplifier configured as a non-inverting amplifier as is well known in the electronic arts. In this configuration, the non-inverting gain of the stage 301 is dictated by the ratio of $((R1+R2)/R2)$, which is on the order 38 for the exemplary resistor values shown in FIG. 3. A resistor R4 (preferably on the order of 5 Kohm) is coupled between the positive input of the operational amplifier and ground potential to provide a ground potential DC reference thereto. A capacitor C2 may be added in parallel with the resistor R1 as part of the feedback path of the amplification stage 301 as shown to improve the stability of the amplifier stage 301 to filter out unwanted frequency components.

The output of the amplification stage 301 is supplied to digital detector 305 (typically realized by a comparator) that outputs a digital "H" value when the voltage level of the signal supplied thereto from the amplification stage 301 exceeds a predetermined reference level and outputs a digital "L" value when the voltage level of the signal supplied thereto from amplification stage 301' does not exceed the predetermined reference level. The reference level may be provided by a resistor divider network or other voltage reference circuit as is well known in the electronic arts. The digital signal values generated by detector 305 are supplied to controller 74 for use in the control methodology as described herein.

Figure 4:
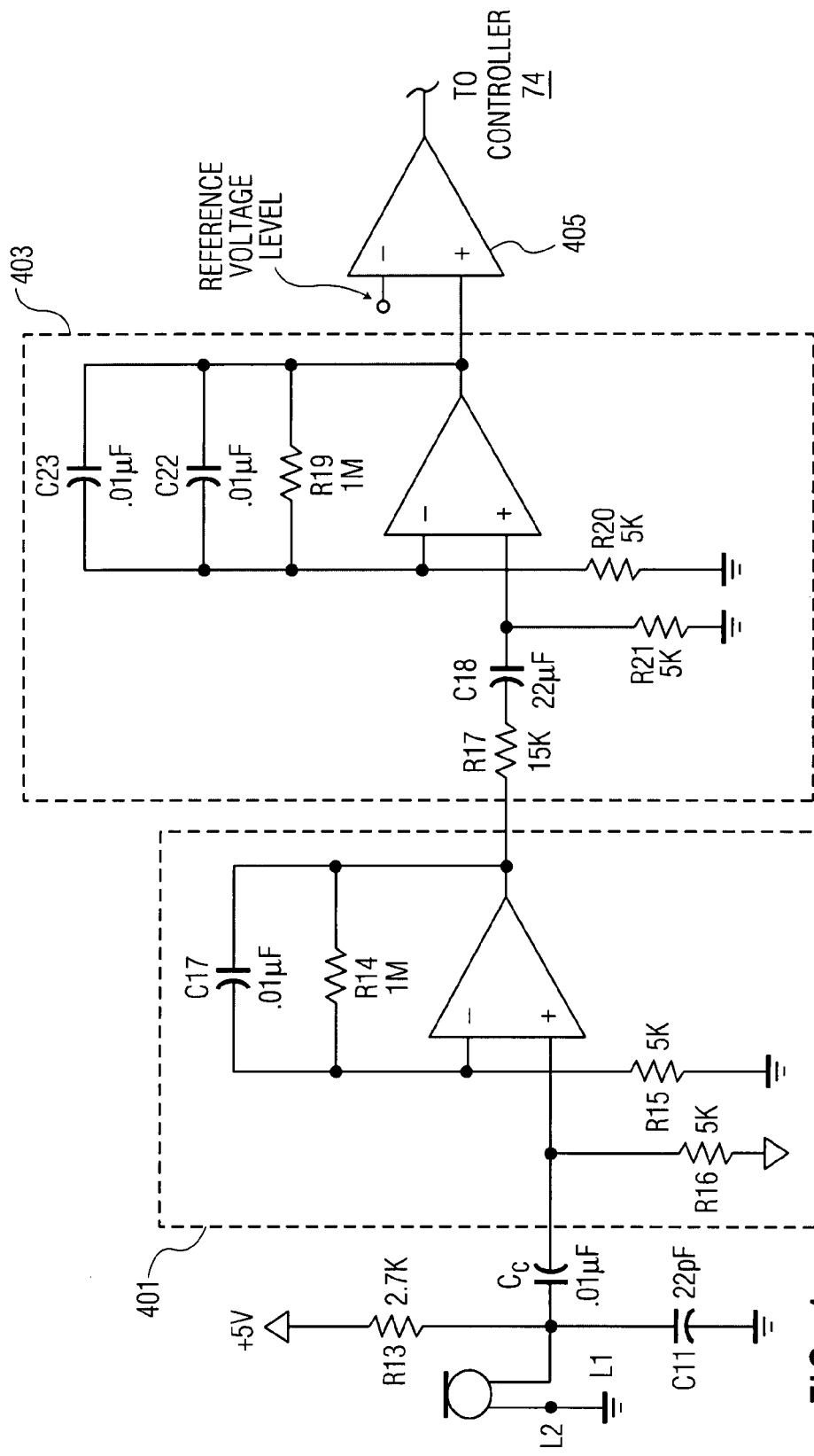
FIG. 4 is a schematic diagram of another exemplary embodiment of the audio signal detection circuitry of FIG. 2.

Turning now to FIG. 4, there is shown another realization of audio signal detection circuitry 81 of FIG. 2. This circuitry employs two amplification stages to provide large signal gain. The circuitry includes a bias resistor R13 (for example, on the order of 2.7 kOhms) coupled between a positive voltage supply (e.g., 5 Volts) and the positive lead L1 of the microphone pickup device (labeled "micro1"). The negative lead L2 of the microphone pickup device is coupled to ground. The microphone pickup device is preferably an electret condenser microphone cartridge as described above.

A capacitor C11 (for example, on the order of 22 pF) may be coupled between the positive lead L1 and ground for filtering out unwanted high frequency components generated at the positive lead L1 of the microphone pickup device. A coupling capacitor Cc (for example, on the order of 0.01 µF) is coupled between the positive lead L1 and a first amplification stage 401 for DC isolation therebetween. The first amplification stage 401 is realized by an operation amplifier configured as a non-inverting amplifier as is well known in the electronic arts. In this configuration, the non-inverting gain of the stage 401 is dictated by the ratio of ((R14+R15)/R15), which is on the order of 201 for the exemplary resistor values shown in FIG. 4. A resistor R16 (preferably on the order of 5 Kohm) is coupled between the positive input of the operational amplifier and ground potential to provide a ground potential DC reference thereto. A capacitor C17 may be added in parallel with the resistor R14 as part of the feedback path of the amplification stage 401 as shown to improve the stability of the amplifier stage 401 and filter out unwanted frequency components.

The output of first amplification stage 401 is supplied to second amplification stage 403, which is realized by an operation amplifier configured as a non-inverting amplifier as is well known in the electronic arts. In this configuration, the non-inverting gain of the stage 403 is dictated by the ratio of (((R19+R20)/R20), which is on the order of 201 for the exemplary resistor values shown in FIG. 4. A resistor R21 (preferably on the order of 5 kOhms) is coupled between the positive input of the operational amplifier and ground potential to provide a ground potential DC reference thereto. A resistor R17 (preferably on the order of 15 Kohm) and capacitor C18 (preferably on the order of 22 µF) are series coupled between the output of the first stage 401 and the positive input of the operational amplifier to provide AC coupling (DC isolation) between the two stages. One or more capacitors (for example, two capacitors C22 and C23 each on the order of 0.01 µF as shown) may be added in parallel with the resistor R19 as part of the feedback path of the amplification stage 403 as shown to improve the stability of the amplifier stage 403 and filter out unwanted frequency components.

The output of second amplification stage 403 is supplied to digital detector 405 (typically realized by a comparator) that outputs a digital "H" value when the voltage level of the signal supplied thereto from the amplification stage 403 exceeds a predetermined reference level and outputs a digital "L" value when the voltage level of the signal supplied thereto from amplification stage 403 does not exceed the predetermined reference level. The reference level may be provided by a resistor divider network or other voltage reference circuit as is well known in the electronic arts. The digital signal values generated by detector 405 are supplied to controller 74 for use in the control methodology as described herein.

In the embodiment described above with respect to FIGS. 3 and 4, the amplification gain is selected to provide ambient noise amplification that does not exceed the reference level of the digital detector. Note that the circuitry amplifies all noise, and in particular any noise generated by the operation of the cooling system 40 will be amplified. Therefore, it is possible that the amplified output resulting from such noise will exceed the reference level of the digital detector, and therefore potentially cause erroneous operation. However, because the controller 74 also controls the machine's cooling system, it can readily be adapted to ignore the signals generated by the digital detector while the cooling system is running.

In some applications, the circuitry of FIGS. 3 and 4 cannot be used successfully because the environment in which the machine is located is noisy in its own right. For example, the circuitry of FIGS. 3 and 4 may be unsuitable for outdoor locations or indoor locations in loud ambient noise environments (such as a factory). In addition, variations in the installation of the microphone, as well as machine to machine variations and changes that occur to the machines as they age, can cause the intensity of the sound to vary significantly. In these applications, the amplified output resulting from such ambient noise levels will likely exceed the reference level of the digital detector, and therefore potentially cause erroneous operation.

Figure 5:
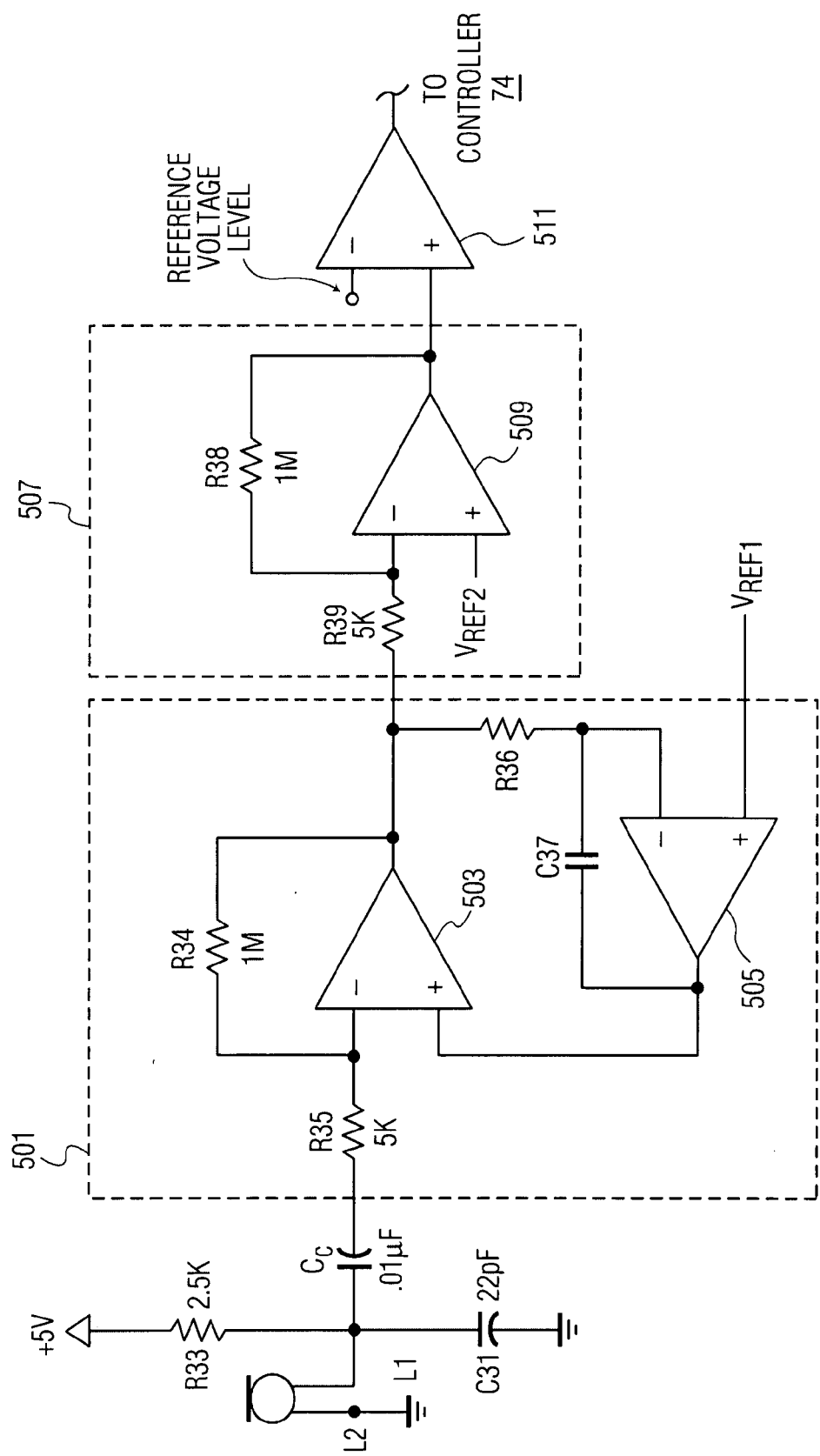
FIG. 5 is a schematic block diagram of yet another exemplary embodiment of the audio signal detection circuitry of FIG. 2.

Turning now to FIG. 5, there is shown an exemplary realization of the audio signal detection circuitry 81 of FIG. 2. The circuitry of FIG. 5 self-adjusts to eliminate background noise, while still detecting fast rate audio signals that are indicative of vending sales. Thus, such circuitry is suitable for loud ambient noise environments, and addresses many of the limitations of the circuitry of FIGS. 3 and 4 as discussed above. The circuitry of FIG. 5 includes a bias resistor R33 coupled between a positive voltage supply (e.g., 5 Volts) and the positive lead L1 of the microphone pickup device (labeled "micro1"). The negative lead L2 of the microphone pickup device is coupled to ground. The microphone pickup device is preferably an electret condenser microphone as described above. A capacitor C31 (for example, on the order of 22 pF) may be coupled between the positive lead L1 and ground for filtering out unwanted high frequency components generated at the positive lead L1 of the microphone pickup device. A coupling capacitor Cc is coupled between the positive lead L1 and first amplification stage 501.

First amplification stage 501 is realized by a first operational amplifier 503 configured as an inverting amplifier as is well known in the electronic arts. In this configuration, the first operational amplifier 503 provides a gain value dictated by the ratio of (−R34/R35), which is on the order −200 for the exemplary resistor values shown in FIG. 5. A second operational amplifier 505 is operably coupled in the feedback path from the output node of the first operational amplifier 503 to the positive terminal of the first operational amplifier 503 as shown. The second operational amplifier 505 is configured as an integrator/low-pass-filter stage that filters out the higher frequency impulse signal but allows the lower frequency ambient noise signal level to pass through the feedback path. The characteristic time constant (and pole) of the second operational amplifier 505 is dictated by the ratio (R36/C37), which is selected to filter out the higher frequency impulse signal components and pass the lower frequency ambient noise signal level. In this configuration, the second operational amplifier 505 integrates the difference between the ambient noise signal level (which is produced by the first stage operational amplifier 503) and a reference node voltage level (which may be provided by a resistor divider network or other voltage reference circuits as is well known in the electronic arts). When this difference signal increases, the output of the second operational amplifier 505 drives the voltage level at the positive terminal of the first operational amplifier 503 higher. This feedback operation continues such that the voltage level at the positive terminal of the first operational amplifier 503 tracks the ambient noise level. In this manner, the two operational amplifier circuits 503 and 505 cooperate to cancel out the effect of ambient noise. Any impulse sound signal greater than the ambient noise level is amplified by the first operational amplifier circuit 503. One or more capacitors (not shown) may be added in parallel with the resistor R34 as part of the negative feedback path of the first amplification stage 501 to provide stability and desired filtering as described above. The output of first amplification stage 501 is supplied to second amplification stage 507.

Second amplification stage 507 is realized by operational amplifier 509 that is also configured as an inverting amplifier. In this configuration, operational amplifier 509 provides a gain value dictated by the ratio of (−R38/R39), which is on the order −200 for the exemplary resistor values shown in FIG. 5. A positive voltage reference (labeled 'Vref'), which may be provided by a resistor divider network or other voltage reference circuits as is well known in the electronic arts, is operably coupled to the positive terminal of operational amplifier 509 to provide a positive potential DC reference. One or more capacitors (not shown) may be added in parallel with the resistor R38 as part of the negative feedback path of second amplification stage 507 to provide stability and desired filtering as described above.

The output of second amplification stage 507 is supplied to digital detector 511 (typically realized by a comparator) that outputs a digital "H" value when the voltage level of the signal supplied thereto from amplification stage 507 exceeds a predetermined reference voltage level, and outputs a digital "L" value when the voltage level of the signal supplied thereto from amplification stage 507 is less than the predetermined reference voltage level. The reference voltage level may be provided by a resistor divider network or other voltage reference circuits as is well known in the electronic arts. The digital signal values generated by detector 511 are supplied to controller 74 for use in the control methodology as described herein.

Advantageously, the audio signal detection circuitry described above with respect to FIG. 5 cancels out the effect of ambient noise and is able to accurately detect impulse sound signals in loud ambient noise environments.

While the algorithm used for entering, exiting, and transitioning between normal-operation mode and the power-conservation mode(s) is programmable, the default program determines the mode based on ambient temperature (i.e., temperature of the environment where machine 10 is located) and dispensing events that occur during dispensing operations performed by vending machine 10.

Figure 6:
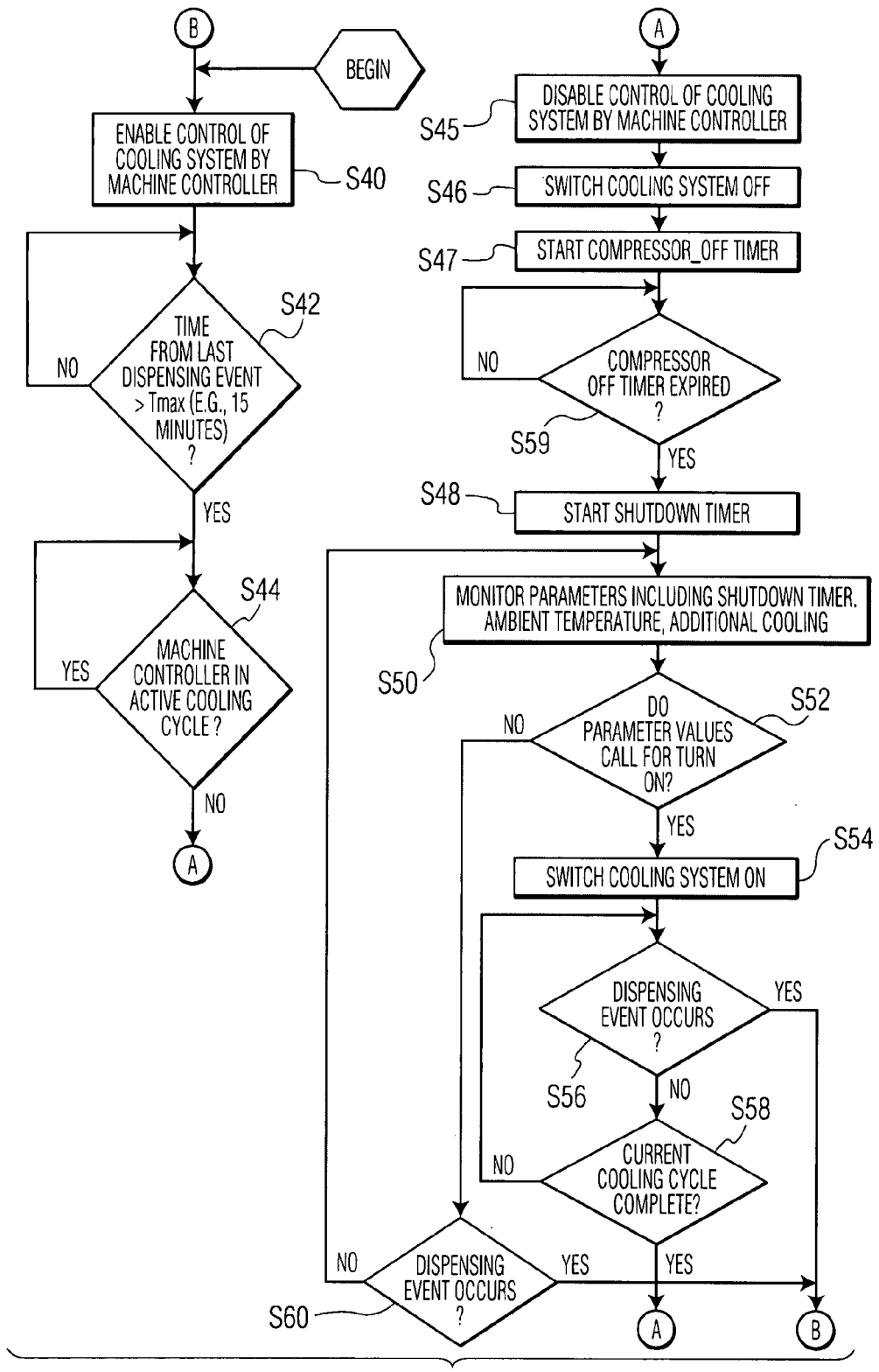
FIG. 6 is a flow chart of an exemplary power-management control scheme carried out by the control system of FIG. 2.

An exemplary control methodology realized by the control module 80b in accordance with the present invention is illustrated in the flow chart of FIG. 6. Initially, the control operations enter the normal-operation mode in step S40. In step S40, the normal-operation mode cooling operations are enabled (for example, by supplying the normal-operation mode enable signal to compressor power control circuitry 46B). Preferably, as part of the normal-operation mode cooling operations, the compressor of the cooling system is cycled on for a period of time when the internal temperature of chamber 30 exceeds a high threshold internal temperature to thereby cool chamber 30.

In step S42, the time from the last dispensing event, which is provided by timer circuitry 76, is monitored to determine if this time is greater than a predetermined maximum time (e.g., 15 minutes). If not, the cooling system control routine remains in the normal-operation mode and returns back to step S42 to monitor the time from the last dispensing event; otherwise the operation jumps to step S44 as shown.

In step S44, a determination is made whether machine controller 62 is in an active cooling cycle (for example, by monitoring the data signal supplied by voltage sensor 77). If so, the process returns to step S44 to wait until the active cooling cycle ends; otherwise the process continues to the power-saving mode in step S45.

In step S45, the normal-operation mode cooling operations are disabled (for example, by supplying the normal-operation mode disable signal to the compressor power control circuitry 46B). As a result, the compressor power ON/OFF control signals generated by machine controller 62 are ignored. The process continues to step S46.

In step S46, power-savings mode cooling system control routine 80b cooperates with compressor power control circuitry 46B to deactivate compressor 45. In addition, power-savings mode cooling system control routine 80b preferably cooperates with the fan power control circuitry 46A to deactivate circulating fans F1 and F2 to provide maximal power savings. The process then continues to step S47.

In step S47, the compressor_off_timer is set to a predetermined time period, and the process proceeds to step S59. In step S59, a determination is made to ensure that the compressor_off_timer has expired. If the timer has not expired, the control routine waits in step S59 until the compressor_off_timer expires, and then proceeds to step S48.

In step S48, the Shutdown Countdown Timer is started, and the process proceeds to step S50.

In step S50, parameters including the shutdown timer, ambient temperature provided by temperature sensor T2 and possibly other parameters and data signals are monitored. For example, an additional parameter may be used to provide an indication that additional power-saving mode cooling cycles are required to be executed. At block S52, if it is found that the parameter values call for activating cooling system 40, the process continues to step S54; otherwise, the process jumps to step S60 as described below.

In step S54, compressor 45 and circulating fans F1 and F2 are turned on (via cooperation between power-savings mode cooling system control routine 80b and power control circuitry 46A, 46B) to activate the supply of power to the fans and the compressor, respectively, and the process proceeds to S56. In step S56, the dispensing event data signals are monitored to determine if there is an occurrence of a predetermined dispensing event. As described above, the occurrence of the predetermined dispensing event generates sound signals related thereto during the operation of machine 10. Such dispensing events may include, for example, the delivery of product to a delivery location, the selection of one desired product from an offering of many products, customer access of a delivery mechanism (e.g., access door). These events occur every time a product (such as a container, can or bottle) is dispensed from machine 10 in accordance with the dispensing operations controlled by machine controller 62. If the occurrence of a predetermined dispensing event data signal is identified in step S56, the process exits the power-conservation mode and jumps to the normal-operation mode which begins at step S40; otherwise the process continues to step S58.

In step S58, a determination is made if the current cooling cycle is complete. The completion of the current cooling cycle can be based upon any number of parameters such as ambient temperature, internal chamber temperature, elapsed time, etc. If it is determined that the current cooling cycle is not complete, the process returns to step S56 to monitor the dispensing event signals. However, if it is determined that the current cooling cycle is complete, the process returns to step S45 to begin another cooling cycle in the power-conservation mode.

Returning to step S52, if the parameter values do not call for activating the cooling system, the process jumps to step S60. In step S60, as in step S56, the dispensing event data signals are monitored to determine if there is an occurrence of a predetermined dispensing event. If the predetermined dispensing event has not occurred, the process returns back to step S50 to monitor parameters for turn on. However, if the dispensing event has occurred, the process returns to step S40 and the normal-operation mode resumes.

Note that the parameter values (e.g., shutdown timer value, ambient temperature, etc.) that trigger switching the cooling system on in steps S50 to S54 of the power-conservation mode are selected such that temperature stratification occurs within the appliance, which allows the internal temperature of the appliance to be maintained at a higher average temperature than in the normal-operation mode. Due to temperature stratification, a portion of the chamber (e.g., a location within the chamber from which containers will soon be dispensed) will remain at a desired temperature for longer periods of time without cooling. Such operations save energy in several ways. First, the cooling cycles are less frequent, which reduces the number of times the cooling system has to start up and thus saves energy involved in starting up the cooling system. In addition, there is less heat transfer from the exterior while the average internal temperature is elevated. Finally, energy is saved while the circulating fans are off as less energy is used and less heat from fan motor(s) is dissipated into the refrigerated chamber. Moreover, because the control operations automatically exit the power-conservation mode and return to the normal-operation mode when vending machine 10 is actively dispensing product, vending machine 10 maintains a cooler average temperature of chamber 30 when vending machine 10 is actively dispensing product (as compared to the average temperature of chamber 30 when the vending machine has been inactive in dispensing beverages for a predetermined time interval, e.g., the predetermined maximum time period in step S18). This ensures that patrons receive product at the desired temperature.

The operation of the power-savings mode cooling system control routine 80b is programmable. The predetermined maximum time period in step S42 can be adjusted. In addition, the energy savings controller 74 may interface to other sensors that can be used in controlling the mode of operation. For example, an absolute-time sensor, such as time-of-year sensor TOY, can be used to affect vending machine behavior at certain times of the day, on certain days of the week, and certain holidays, or an ambient temperature sensor external to the vending machine and/or an occupancy sensor can be used to control the mode of operation.

There have been described and illustrated herein several embodiments of refrigerated appliances and power control modules/methodologies used therein that intelligently manage the supply of power to components of the cooling system of such appliances such that proper operating temperature is maintained while energy is conserved. While particular embodiments of the invention have been described, it is not intended that the invention be limited thereto, as it is intended that the invention be as broad in scope as the art will allow and that the specification be read likewise. Moreover, while particular configurations of control architectures and schemes have been disclosed, it will be appreciated that other configurations could be used as well. For example, and not by way of limitation, it is contemplated that the control schemes can automatically transition between the normal-operating mode and more than one power-saving mode of operation. Such power-saving modes might activate cooling based upon different ambient temperature levels. Alternatively, such power saving modes may be based on dynamic modulation of the power supplied to the cooling system components (e.g., circulating fan motor, compressor, etc). It will therefore be appreciated by those skilled in the art that yet other modifications could be made to the provided invention without deviating from its spirit and scope as claimed.

What is claimed:

1. A refrigerated appliance for dispensing items and for use with a power source, said refrigerated appliance comprising:
   a cooling system;
   power control circuitry that selectively provides electrical coupling of at least one component of said cooling system to said power source;
   an audio signal detector for generating at least one dispensing event signal that represents the occurrence of one or more sound-based dispensing events; and
   a controller, operably coupled to said power control circuitry and said audio signal detector, that is adapted to control said power control circuitry in at least one power-conserving mode of operation and/or in a normal-operation mode, said controller automatically transitioning between said at least one power-conserving mode and said normal-operation mode based on said at least one dispensing event signal supplied to said controller by said audio signal detector.

2. A refrigerated appliance according to claim 1, wherein said controller is adapted to automatically transition from said at least one power-conserving mode to said normal-operation mode in response to detection of a dispensing event that is identified by said at least one dispensing event signal.

3. A refrigerated appliance according to claim 2, wherein said controller is adapted to automatically transition from said normal-operation mode to said at least one power-conserving mode after expiration of a delay period subsequent to detection of said dispensing event.

4. A refrigerated appliance according to claim 1, wherein said controller is adapted to automatically transition from said at least one power-conserving mode to said normal-operation mode based on at least one parameter value.

5. A refrigerated appliance according to claim 4, wherein said at least one parameter value is selected from the group consisting of an ambient temperature value, an internal temperature, and a shutdown timer value.

6. A refrigerated appliance according to claim 5, further comprising:
   at least one of a temperature sensor that senses said ambient temperature, an internal temperature sensor that senses said internal temperature, and/or timer circuitry that tracks said shutdown timer value.

7. A refrigerated appliance according to claim 1, further comprising:
   a timer operably coupled to said controller and adapted to track an elapsed time from a last dispensing event as indicated by said dispensing event signal, and wherein said controller is adapted to automatically transition from said normal-operation mode to said at least one power-conserving mode based upon a determination that said elapsed time exceeds a predetermined threshold time.

8. A refrigerated appliance according to claim 1, further comprising:
   at least one item dispensing mechanism disposed in said refrigerated appliance to dispense items, said at least one item dispensing mechanism associated with the occurrence of one or more sound-based dispensing events;

a machine controller that interfaces to said at least one item dispensing mechanism, said machine controller adapted to control automatic dispensing of said items by said at least one item dispensing mechanism.

9. A refrigerated appliance according to claim 1, wherein said audio signal detector comprises an audio signal pickup device and signal processing circuitry that interfaces the audio signal pickup device to said controller.

10. A refrigerated appliance according to claim 9, said appliance further comprising:

a dispensing port through which dispensed items pass for delivery to a patron, wherein said audio signal pickup device is disposed in the vicinity of said dispensing port to sense items passing therethrough.

11. A refrigerated appliance according to claim 9, said appliance further comprising:

a customer-access delivery mechanism that is manipulated by patrons for delivery of items thereto, wherein said audio signal pickup device is disposed in the vicinity of said customer-access delivery mechanism to sense manipulation of said customer-access delivery mechanism by a patron.

12. A refrigerated appliance according to claim 9, said appliance further comprising:

mechanized devices that select a desired product from an offering of many products, wherein said audio signal pickup device is disposed in the vicinity of at least one of said mechanized devices to sense operation of said mechanized devices.

13. A refrigerated appliance according to claim 9, wherein said signal processing circuitry amplifies signals produced by said audio signal pickup device.

14. A refrigerated appliance according to claim 13, wherein said signal processing circuitry comprises an operational amplifier configured as an non-inverting amplifier.

15. A refrigerated appliance according to claim 13, wherein said signal processing circuitry comprises a first operational amplifier configured as an inverting amplifier and a second operation amplifier configured as an integrator that provides a feedback signal representing an ambient noise level to said first operational amplifier.

16. A refrigerated appliance according to claim 9, wherein said audio signal pickup device comprises an electret condenser microphone.

17. A refrigerated appliance according to claim 1, wherein said appliance comprises a refrigerated vending machine.

18. A refrigerated appliance according to claim 1, wherein said cooling system includes a compressor, and said power control circuitry is adapted to selectively couple said compressor to said power source in both said at least one power-saving mode and said normal-operation mode.

19. A refrigerated appliance according to claim 1, wherein said cooling system includes a circulating fan, and said power control circuitry is adapted to couple said circulating fan to said power source in said normal-operation mode and decouple said circulating fan from said power source in said at least one power-conserving mode.

20. A refrigerated appliance according to claim 1, wherein an average internal temperature of said appliance is less in said normal-operation mode than in said at least one power-conserving mode.

21. A power-management control system for managing a supply of power supplied by a power source to a cooling system of a refrigerated appliance, said power-management control system comprising:

an audio signal detector for generating at least one dispensing event signal that represents an occurrence of one or more sound-based dispensing events;

power control circuitry that selectively provides electrical coupling of at least one component of said cooling system to said power source; and a controller, operably coupled to said power control circuitry and said audio signal detector, that is adapted to control said power control circuitry in at least one power-conserving mode of operation and/or in a normal-operation mode, said controller automatically transitioning between said at least one power-conserving mode and said normal-operation mode based on said at least one dispensing event signal supplied to said controller by said audio signal detector.

22. A power-management control system according to claim 21, wherein said controller is adapted to automatically transition from said at least one power-conserving mode to said normal-operation mode in response to detection of a dispensing event that is identified by said at least one dispensing event signal.

23. A power-management control system according to claim 22, wherein said controller is adapted to automatically transition from said normal-operation mode to said at least one power-conserving mode after expiration of a delay period subsequent to detection of said dispensing event.

24. A power-management control system according to claim 21, wherein said controller is adapted to automatically transition from said at least one power-conserving mode to said normal-operation mode based on at least one parameter value.

25. A power-management control system according to claim 24, wherein said at least one parameter value is selected from the group consisting of an ambient temperature, an internal temperature, and a shutdown timer value.

26. A power-management control system according to claim 25, further comprising:

at least one of a temperature sensor that senses said ambient temperature, an internal temperature sensor that senses said internal temperature, and/or timer circuitry that tracks said shutdown timer value.

27. A power-management control system according to claim 21, further comprising:

a timer operably coupled to said controller and adapted to track an elapsed time from a last dispensing event as indicated by said dispensing event signal, and wherein said controller is adapted to automatically transition from said normal-operation mode to said at least one power-conserving mode upon a determination that said elapsed time exceeds a predetermined threshold time.

28. A power-management control system according to claim 21, wherein said refrigerated appliance further comprises a dispensing controller that interfaces to at least one item dispensing mechanism, said dispensing controller adapted to control automatic dispensing of items by said at least one item dispensing mechanism.

29. A power-management control system according to claim 21, wherein said audio signal detector comprises an audio signal pickup device and signal processing circuitry that interfaces the audio signal pickup device to said controller.

30. A power-management control system according to claim 29, wherein said refrigerated appliance further comprises a dispensing port through which dispensed items pass for delivery to a patron, and said audio signal pickup device is disposed in the vicinity of said dispensing port to sense items passing therethrough.

31. A power-management control system according to claim 29, wherein said appliance further comprising a customer-access delivery mechanism that is manipulated by patrons for delivery of items thereto, and said audio signal pickup device is disposed in the vicinity of said customer-access delivery mechanism to sense manipulation of said customer-access delivery mechanism by a patron.

32. A power-management control system according to claim 29, said appliance further comprising mechanized devices that select a desired product from an offering of many products, and said audio signal pickup device is disposed in the vicinity of said mechanized devices to sense operation of said mechanized devices.

33. A power-management control system according to claim 29, wherein said signal processing circuitry amplifies signals produced by audio signal pickup device.

34. A power-management control system according to claim 33, wherein said signal processing circuitry comprises an operational amplifier configured as an non-inverting amplifier.

35. A power-management control system according to claim 33, wherein said signal processing circuitry comprises a first operational amplifier configured as an inverting amplifier and a second operation amplifier configured as an integrator that provides a feedback signal representing an ambient noise level to said first operational amplifier.

36. A power-management control system according to claim 29, wherein said audio signal pickup device comprises an electret condenser microphone.

37. A power-management control system according to claim 21, wherein said controller is external to said refrigerated appliance.

38. A power-management control system according to claim 21, wherein said controller is internal to said refrigerated appliance.

39. A power-management control system according to claim 21, wherein said refrigerated appliance comprises a vending machine.

40. A method for controlling a refrigerated appliance having at least one power-conserving mode and a normal-operation mode, said method comprising the steps of:

detecting the occurrence of one or more sound-based dispensing events associated with said refrigerated appliance; and transitioning between said at least one power-conserving mode and said normal-operation mode based on the detected one or more sound-based dispensing events.

41. The method of claim 40, further comprising the step of:

transitioning from said normal-operation mode to said at least one power-conserving mode after expiration of a delay period subsequent to the detected one or more sound-based dispensing events.

42. The method of claim 40, wherein said step of detecting the occurrence of one or more sound-based dispensing events comprises the step of detecting at least one of (i) an item passing through an item dispensing port of the refrigerated appliance, (ii) manipulation of a customer access delivery mechanism, and/or (iii) operation of mechanical devices disposed within the refrigerated appliance.

43. The method of claim 40, wherein said step of transitioning between the power-conservation mode and the normal-operation mode comprises the step of coupling a circulation fan to a power source.

* * * * *